United States Patent [19]
Iwata et al.

[11] Patent Number: 5,386,695
[45] Date of Patent: Feb. 7, 1995

[54] AIR-FUEL RATIO CONTROL SYSTEM FOR INTERNAL COMBUSTION ENGINES, HAVING CATALYTIC CONVERTER DETERIORATION-DETECTING FUNCTION

[75] Inventors: Yoichi Iwata; Toshihiko Sato; Yasunari Seki; Tsuyoshi Takizawa, all of Wako; Takayoshi Nakayama, Tochigi, all of Japan

[73] Assignee: Honda Giken Kogyo Kabushiki Kaihsa, Tokyo, Japan

[21] Appl. No.: 183,750

[22] Filed: Jan. 21, 1994

[30] Foreign Application Priority Data

Jan. 21, 1993 [JP] Japan .................................. 5-026286

[51] Int. Cl.6 .............................................. F01N 3/22
[52] U.S. Cl. ........................................ 60/276; 60/277; 60/285; 123/703
[58] Field of Search ................ 60/274, 276, 277, 285; 123/672, 674, 703

[56] References Cited

U.S. PATENT DOCUMENTS

| | | | |
|---|---|---|---|
| 4,106,448 | 8/1978 | Noguchi | 60/285 |
| 5,074,113 | 12/1991 | Matsuoka | 60/285 |
| 5,090,199 | 2/1992 | Ikuta | 60/276 |
| 5,154,055 | 10/1992 | Nakane | 60/277 |
| 5,228,286 | 7/1993 | Demura | 60/285 |
| 5,247,793 | 9/1993 | Yamada | 60/277 |
| 5,279,114 | 1/1994 | Kurita | 60/276 |
| 5,280,707 | 1/1994 | Nakashima | 60/285 |
| 5,311,737 | 5/1994 | Komatsu | 60/285 |
| 5,325,664 | 7/1994 | Seki | 60/276 |

Primary Examiner—Ira S. Lazarus
Assistant Examiner—Daniel J. O'Connor
Attorney, Agent, or Firm—Nikaido, Marmelstein, Murray & Oram

[57] ABSTRACT

An air-fuel ratio control system for an internal combustion engine having a catalytic converter arranged in the exhaust system, and first and second air-fuel ratio sensors arranged upstream and downstream of the catalytic converter respectively has an ECU which calculates an air-fuel ratio correction amount, based at least on an output from the first air-fuel ratio sensor, and detects deterioration of the catalytic converter, based on an output from the second air-fuel ratio sensor when the engine is in a predetermined operating condition. The ECU inhibits detection of deterioration of the catalytic converter when the air-fuel ratio correction amount falls outside a predetermined range.

6 Claims, 15 Drawing Sheets

AIR-FUEL RATIO CONTROL SYSTEM FOR INTERNAL COMBUSTION ENGINES, HAVING CATALYTIC CONVERTER DETERIORATION-DETECTING FUNCTION

BACKGROUND OF THE INVENTION

1. Field of the Invention

This invention relates to an air-fuel ratio-control system for an internal combustion engine, which has air-fuel ratio sensors provided at respective locations upstream and downstream of a catalytic converter arranged in the exhaust system of the engine, and controls the air-fuel ratio of an air-fuel mixture supplied to the engine, based on outputs from the air-fuel ratio sensors, and more particularly to an air-fuel ratio control system of this kind, which has a function of detecting deterioration of the catalytic converter.

2. Prior Art

There is conventionally known an air-fuel ratio control system for internal combustion engines, which has, as air-fuel ratio sensors, oxygen concentration sensors (hereinafter referred to as "the O2 sensors") arranged, respectively, upstream and downstream of a three-way catalyst as a catalytic converter arranged in the exhaust system of the engine, and carries out feedback control of the air-fuel ratio of a mixture supplied to the engine (hereinafter referred to as "the supplied air-fuel ratio"), based on outputs from the O2 sensors.

To detect the deterioration degree of the catalytic converter, an air-fuel ratio control system of this kind has been proposed by the present assignee, as disclosed in U.S. Ser. No. 07/961,794 filed Oct. 16, 1992, according to which, during execution of feedback control in which an air-fuel ratio correction coefficient (air-fuel ratio correction amount) KO2 is calculated based only on an output from the downstream O2 sensor, measurements are made of a time period TL elapsed from a time point a special P term (proportional term) for skipping the value of the correction coefficient KO2 in a decreasing direction is generated to a time point the output from the downstream O2 sensor is inverted correspondingly, and a time period TR elapsed from a time point a special P term for skipping the KO2 value in an increasing direction to a time point the output from the downstream O2 sensor is inverted correspondingly, and then an average value of these measured time periods TL and TR are calculated, to thereby determine that the catalyst is deteriorated when the calculated average value is smaller than a predetermined value, based on the fact that the average value decreases with advancement of deterioration of the performance of the catalyst (O2 storage capacity).

Further, in the above proposed control system, similarly to the conventional air-fuel ratio control system in general, predetermined upper and lower limit values are provided for the KO2 value in order to detect failure of a fuel injection valve, such as fuel leakage and clogging of the valve element or the fuel supply pipe. That is, if fuel leaks from the fuel injection valve into the intake pipe, an amount of fuel supplied into the cylinder becomes larger than a desired fuel amount. As a result, the KO2 value decreases to be held at the lower limit value. On the other hand, clogging of the fuel injection valve prevents fuel from being supplied to the cylinder, so that the KO2 value increases to be held at the upper limit value.

In the above proposed air-fuel ratio control system, in addition to failure of a fuel injection valve or valves, the KO2 value decreases to be held at the lower limit value when a large amount of evaporative fuel is purged from a canister to the intake pipe.

When the KO2 value is held at the lower limit value during detection of deterioration of the catalytic converter, the actual fuel injection amount becomes larger than the desired amount, so that the output from the downstream O2 sensor continues to assume a value indicative of a rich air-fuel ratio without inversion. On the other hand, when the KO2 value is held at the upper limit value, the actual fuel injection amount becomes smaller than the desired amount, so that the output from the downstream O2 sensor continues to assume a value indicative of a lean air-fuel ratio without inversion.

When the KO2 value is thus held at the upper limit value or the lower limit value, the feedback control based only on the output from the downstream O2 sensor becomes unstable, and the calculated average values of the time periods TL and TR do not properly correspond to the storage capacity of the catalytic converter. As a result, there is a fear that the determination of deterioration of the catalyst cannot be accurately performed.

SUMMARY OF THE INVENTION

It is the object of the invention to provide an air-fuel ratio control system for internal combustion engines, which is capable of accurately performing detection of deterioration of the catalytic converter, based on an output from an O2 sensor arranged downstream of a catalytic converter.

To attain the above object, the present invention provides an air-fuel ratio control system for an internal combustion engine having an exhaust system, and catalytic converter means arranged in said exhaust system, comprising:

first and second air-fuel ratio sensor means arranged in the exhaust system upstream and downstream of the catalytic converter means, respectively;

air-fuel ratio correction amount-calculating means for calculating an air-fuel ratio correction amount, based at least on an output from the first air-fuel ratio sensor means, catalytic converter deterioration-detecting means for detecting deterioration of the catalytic converter means, based on an output from the second air-fuel ratio sensor means when the engine is in a predetermined operating condition; and deterioration detection-inhibiting means for inhibiting operation of the catalytic converter deterioration-detecting means when the air-fuel ratio correction amount falls outside a predetermined range.

Preferably, the air-fuel ratio control system includes deterioration detection-permitting means for permitting the operation of the catalyst deterioration-detecting means after a predetermined time period elapses from a time the air-fuel ratio correction amount returns into the predetermined range.

More preferably, the air-fuel ratio control system includes limiting means for limiting the air-fuel ratio correction amount within a first predetermined range when the air-fuel ratio correction amount falls outside the first predetermined range, and wherein the deterioration detection-inhibiting means inhibits the operation of the catalytic converter deterioration-detecting means when the air-fuel ratio correction amount falls outside a second predetermined range included within the first predetermined range.

Further preferably, the air-fuel ratio control system includes correcting means for correcting the air-fuel ratio correction amount, based on the output from the second air-fuel ratio sensor means.

Still further preferably, the air-fuel ratio control system includes inversion period-measuring means for measuring an inversion period with which the output from the second air-fuel ratio sensor means is inverted, and wherein the catalytic converter deterioration-detecting means detects deterioration of the catalytic converter means, based on the measured inversion period.

The present invention is also applicable to an air-fuel ratio control system for an internal combustion engine having an exhaust system, and catalytic converter means arranged in the exhaust system, comprising:

air-fuel ratio sensor means arranged in the exhaust system downstream of the catalytic converter means;

air-fuel ratio correction amount-calculating means for calculating an air-fuel ratio correction amount, based at least on an output from the air-fuel ratio sensor means;

catalytic converter deterioration-detecting means for detecting deterioration of the catalytic converter means, based on the output from the air-fuel ratio sensor means when the engine is in a predetermined operating condition; and deterioration detection-inhibiting means for inhibiting operation of the catalytic converter deterioration-detecting means when the air-fuel ratio correction amount falls outside a predetermined range.

The above and objects, features, and advantages of the invention will be more apparent from the following detailed description taken in conjunction with the accompanying drawings.

DETAILED DESCRIPTION

The invention will now be described in detail with reference to the drawings showing embodiments thereof.

Figure 1:
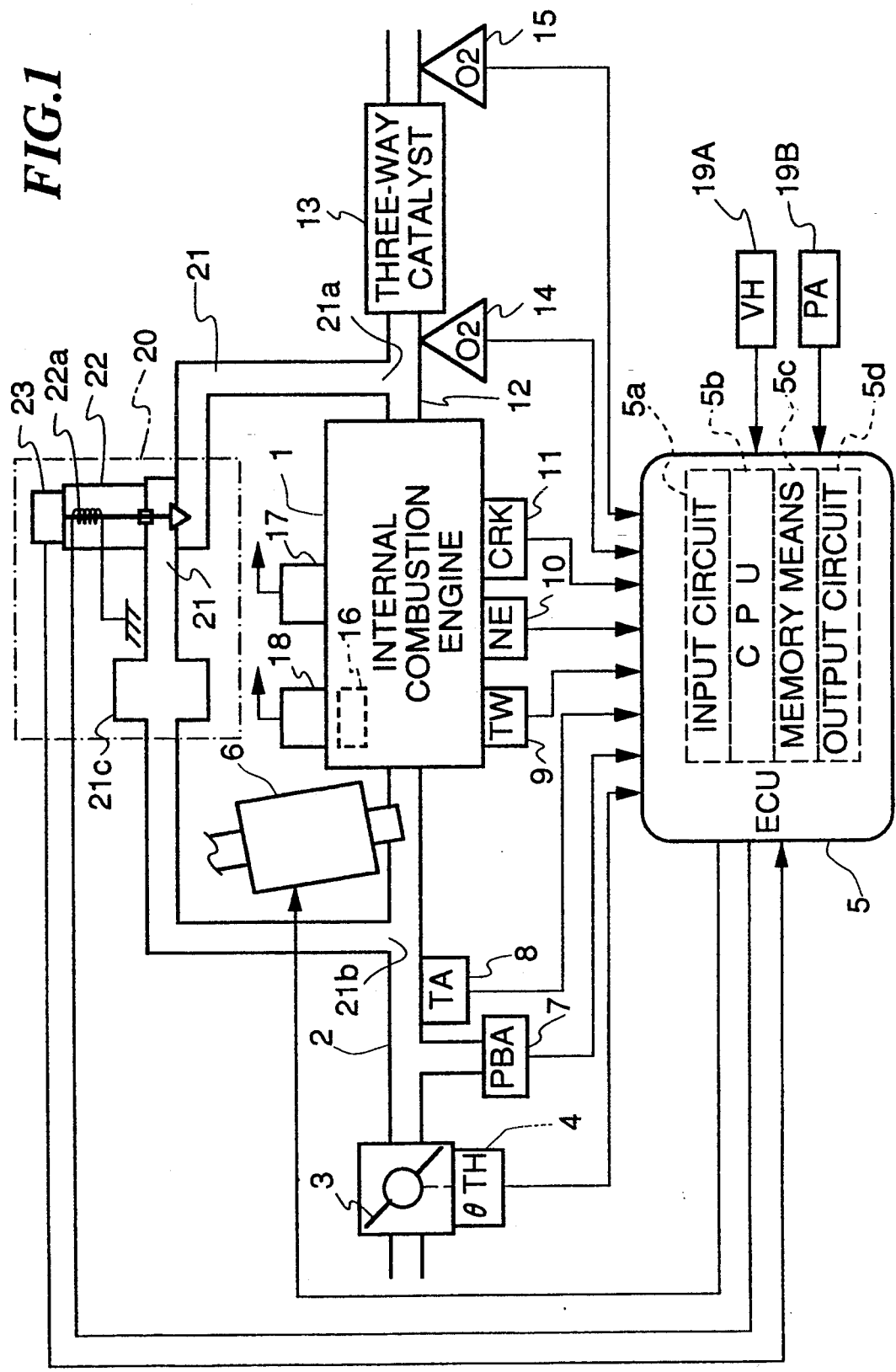
FIG. 1 is a block diagram showing the whole arrangement of an internal combustion engine and an air-fuel ratio control system therefor, according to an embodiment of the invention.

Referring first to FIG. 1, there is shown the whole arrangement of an internal combustion engine and an air-fuel ratio control system therefor according to an embodiment of the invention. In the figure, reference numeral 1 designates an internal combustion engine having four cylinders (hereinafter referred to as "the engine"). In an intake pipe 2 of the engine 1, there is arranged a throttle valve 3. The throttle valve 3 is connected to a throttle valve opening ($\theta$TH) sensor 4 for generating an electric signal indicative of the sensed throttle valve opening and supplying the same to an electronic control unit (hereinafter referred to as "the ECU") 5.

Fuel injection valves 6 are each provided for each cylinder and arranged in the intake pipe 2 between the engine 1 and the throttle valve 3 at a location slightly upstream of an intake valve, not shown. Each fuel injection valve 6 is connected to a fuel pump, not shown, and electrically connected to the ECU 5 to have its valve opening period controlled by a signal therefrom.

On the other hand, an intake pipe absolute pressure (PBA) sensor 7 is provided at a location immediately downstream of the throttle valve 3 for sensing absolute pressure (PBA) within the intake pipe 2, and is electrically connected to the ECU 5 for supplying an electric signal indicative of the sensed absolute pressure within the intake pipe to the ECU 5. An intake air temperature (TA) sensor 8 is inserted into the intake pipe 2 at a location downstream of the intake pipe absolute pressure sensor 7 for supplying an electric signal indicative of the sensed intake air temperature TA to the ECU 5.

An engine coolant temperature (TW) sensor 9, which may be formed of a thermistor or the like, is inserted in a coolant-filled cylinder block of the engine for supplying an electric signal indicative of the sensed engine coolant temperature TW to the ECU 5. An engine rotational speed (NE) sensor 10 and a CRK sensor 11 are arranged in facing relation to a camshaft or a crankshaft of the engine 1, neither of which is shown. The NE sensor 10 generates a pulse as a TDC signal pulse at one of predetermined crank angles whenever the crankshaft rotates through 180 degrees, while the CRK sensor 11 generates a signal pulse (CRK signal pulse) at one of predetermined crank angles of the engine, whenever the crankshaft rotates through e.g. 45 degrees, both of the pulses being supplied to the ECU 5.

A three-way catalyst (catalytic converter; hereinafter referred to as the "catalyst") 13 is arranged in an exhaust pipe 12 of the engine 1. Arranged in the exhaust pipe 12 upstream and downstream of the catalyst 13, respectively, are an upstream O2 sensor 14 and a downstream O2 sensor 15 for detecting the concentration of oxygen present in the exhaust gases at the respective locations, and for supplying electric signals FVO2 and RVO2 indicative of the sensed oxygen concentration to the ECU 5.

Provided at the engine body 1 is a valve timing-changeover system 16, which changes over the valve timing (opening/closing timing) of intake valves and exhaust valves of the engine 1 between low-speed valve timing and high-speed valve timing in response to operating conditions of the engine 1. Hydraulic pressure employed in the valve timing-changeover system 16 for effecting the changeover of the valve timing is detected by a hydraulic pressure sensor 17, and a signal indicative of the sensed hydraulic pressure is supplied to the ECU 5. Further, a spark plug 18 is provided at each of the cylinders of the engine 1 for igniting an air-fuel mixture supplied thereinto.

Further connected to the ECU 5 are a vehicle speed (VH) sensor 19A for detecting the traveling speed of an automotive vehicle on which the engine 1 is installed, and an atmospheric pressure (PA) sensor 19B, and signals indicative of the sensed VH and PA values are supplied to the ECU 5.

An exhaust gas recirculation (EGR) system is generally designated by reference numeral 20, which recirculates part of exhaust gases from the exhaust passage 12 to the intake pipe 2 to reduce an amount of nitrogen oxides (NOx) in the exhaust gases from the engine. The EGR system 20 has an exhaust gas recirculation passage 21 communicating at one end 21a thereof with the exhaust pipe 12 at a location upstream of the catalyst 13 and at the other end 21b thereof with the intake pipe 2 at a location downstream of the throttle valve 3. An exhaust gas recirculation valve 22, which controls an amount of exhaust gas to be recirculated, and a bulk chamber 21c are arranged across the exhaust gas recirculation passage 21. The exhaust gas recirculation valve 22 is an electromagnetic valve having a solenoid 22a which is electrically connected to the ECU 5 such that the valve opening thereof is linearly changed in proportion to the current amount of a control signal from the ECU 5. A lift sensor 23 is connected to a valve element of the exhaust gas recirculation valve 22 for supplying a signal indicative of the sensed valve opening to the ECU 5.

The ECU 5 operates to determine operating conditions of the engine, based on the above-mentioned various signals indicative of operating parameters of the engine supplied from the above-mentioned sensors, and supplies the control signal to the solenoid 22a of the exhaust gas recirculation control valve 22 so as to reduce to zero a difference between a valve opening command valve LCMD of the exhaust gas recirculation valve 22 set in response to the intake pipe absolute pressure PBA and the engine rotational speed NE and an actual value LACT of valve opening of the exhaust gas recirculation valve 22 detected by the lift sensor 23.

The ECU 5 comprises an input circuit 5a having the functions of shaping the waveforms of input signals from various sensors as mentioned above, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed in the CPU 5b, and for storing results of calculations therefrom, etc., and an output circuit 5d which outputs driving signals to the fuel injection valves 6. Further, the ECU 5 has a function of carrying out a misfire detection based on the voltage of the ignition coil, etc.

The CPU 5b operates in response to the above-mentioned engine parameter signals from the sensors to determine a plurality of operating conditions in which the engine 1 is operating, such as open-loop control regions, where an air-fuel ratio feedback control is not carried out, and calculates, based upon the determined engine operating conditions, a fuel injection period Tout over which the fuel injection valves 6 are to be opened, in synchronism with generation of TDC signal pulses, by the use of the following equation (1):

$$Tout = Ti \times KO2 \times KLS \times K1 + K2 \tag{1}$$

where Ti represents a basic fuel injection amount, i.e. a basic value of the fuel injection period Tout, which is determined according to the engine rotational speed NE and the intake pipe absolute pressure PBA.

KO2 represents an air-fuel ratio correction coefficient (hereinafter referred to simply as "the correction coefficient") which is calculated in response to the oxygen concentration in exhaust gases sensed by the upstream and downstream O2 sensors when the engine 1 is operating in an air-fuel ratio feedback control region, while it is set to predetermined values corresponding to the respective operating regions of the engine when the engine 1 is in the open-loop control regions.

KLS represents an air-fuel ratio-leaning coefficient, which is set to a predetermined value smaller than 1.0 (e.g. 0.95) when the engine 1 is in a mixture-leaning operating condition or in a fuel-cut operating condition, i.e. in a predetermined decelerating condition.

K1 and K2 represent other correction coefficients and correction variables, respectively, which are set according to engine operating parameters to such values as optimize engine operating characteristics, such as fuel consumption and engine accelerability.

The CPU 5b supplies driving signals via the output circuit 5d to the fuel injection valves 6, based on the fuel injection period Tout thus calculated, to open the fuel injection valves 6.

Figure 2:
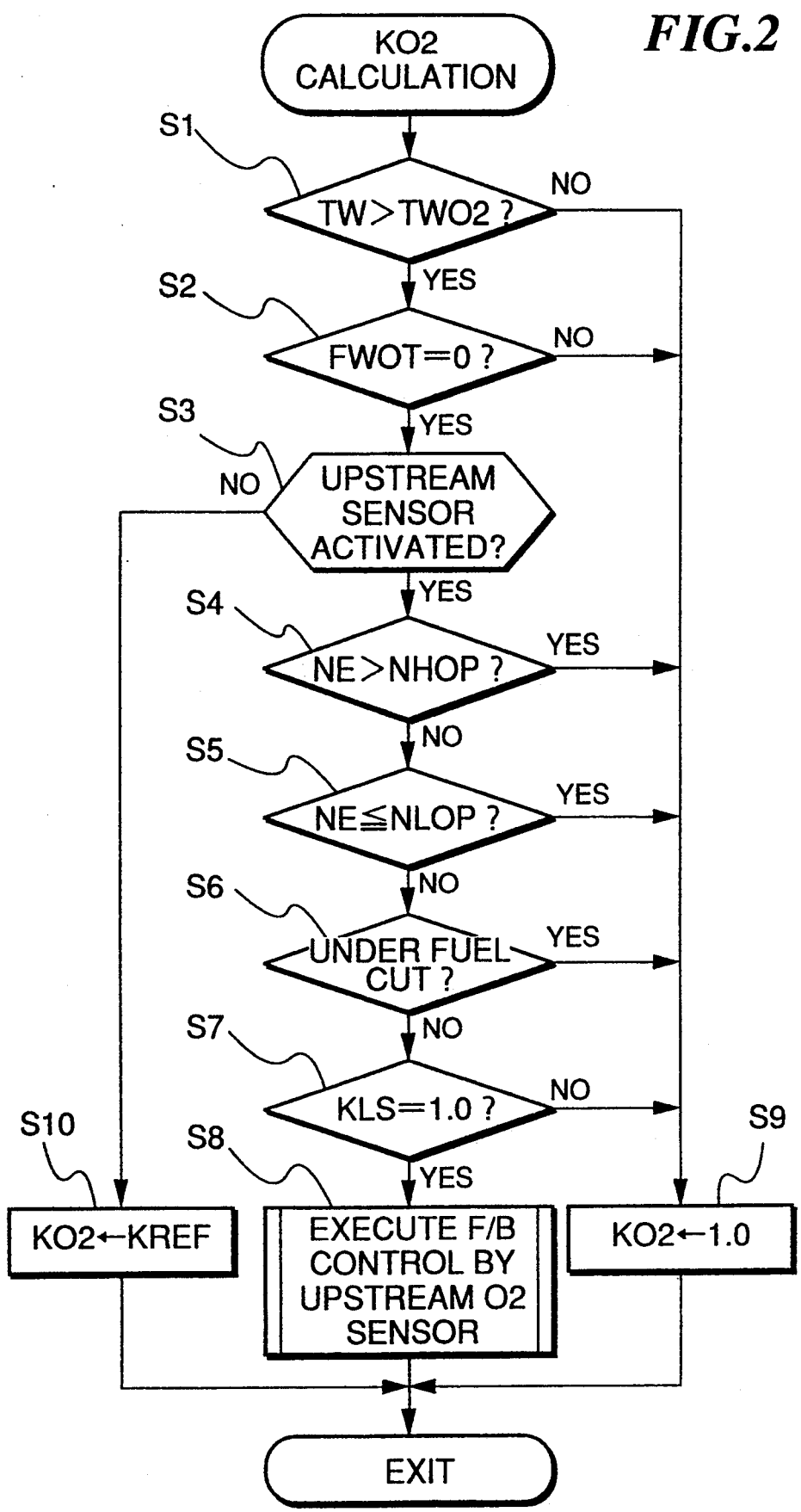
FIG. 2 is a flowchart showing a program for calculating an air-fuel ratio correction coefficient KO2.

FIG. 2 shows a program for calculating the air-fuel ratio correction coefficient KO2, which is executed at predetermined fixed time intervals (e.g. 5 msec).

At steps S1 to S7, it is determined whether or not first feedback control-effecting conditions are satisfied, under which the feedback control based on the output from the upstream O2 sensor 14 can be executed. Specifically, it is determined whether or not the engine coolant temperature TW is higher than a first predetermined engine coolant temperature TWO2 (e.g. 25° C.) at the step S1, whether or not a flag FWOT which is set to a value of 1 when the engine is in a predetermined high load operating condition is equal to a value of 0 at the step S2, whether or not the upstream O2 sensor 14 is activated at the step S3, whether or not the engine rotational speed NE is higher than a predetermined higher engine rotational speed NHOP at the step S4, whether or not the engine rotational speed NE is equal to or lower than a predetermined lower engine rotational speed NLOP at the step S5, whether or not the engine is under fuel cut at the step S6, and whether or not the air-fuel ratio-leaning coefficient KLS is equal to a value of 1.0 at the step S7.

When the engine coolant temperature TW is higher than the predetermined engine coolant temperature TWO2, FWOT=0, the engine is not in the predetermined high load engine operating condition, the upstream O2 sensor 14 is activated, the engine rotational speed NE falls within a range of NLOP<NE≦NHOP, the engine is not under fuel cut, KLS=1.0, and at the same time the engine is not in the predetermined decelerating condition, it is determined that the first feedback control-effecting conditions are satisfied, and then the program proceeds to a step S8, where the correction coefficient KO2 is calculated based on the output from the upstream O2 sensor 14. However, when detection of deterioration of the catalyst 13 (CAT deterioration monitoring) is permitted after the processing of the step S7 (see FIG. 8, described hereinbelow), the program does not proceed to the step S8, but to the program of the CAT deterioration monitoring carried out by a program described hereinbelow.

Further, if both of TW>TWO2 and FWOT=0 are satisfied and at the same time the upstream O2 sensor 14 is inactivated, the program jumps over to a step S10, where the correction coefficient KO2 is set to a learned value KREF calculated during the feedback control at the step S8. If any one of the feedback control-effecting conditions is not satisfied, the program proceeds to a step S9, where the correction coefficient KO2 is set to a value of 1.0.

Figure 3A:
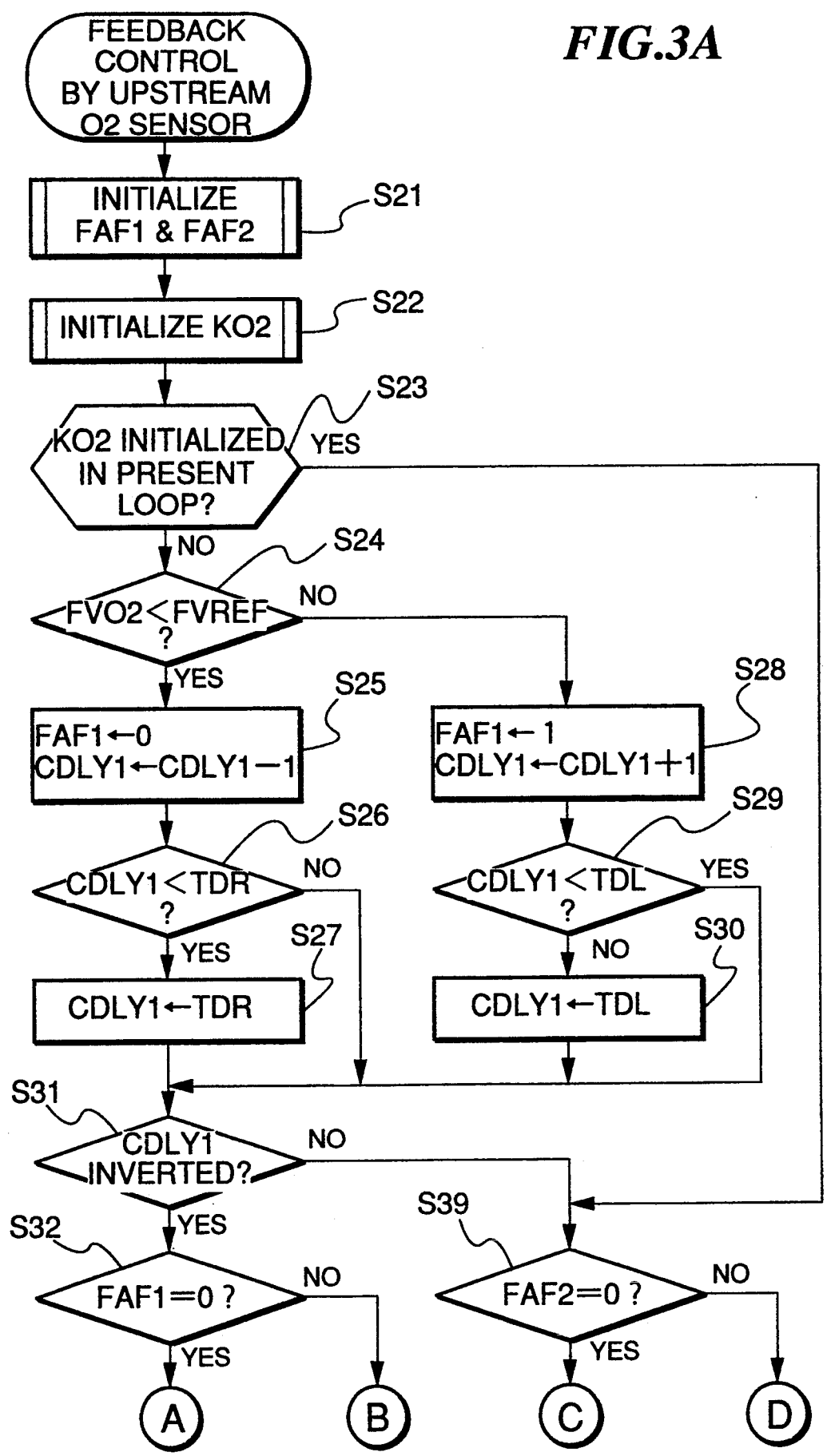
FIG. 3A is a flowchart showing a program for calculating the air-fuel ratio correction coefficient KO2, based on an output from an O2 sensor arranged upstream of a catalytic converter.
Figure 3B:
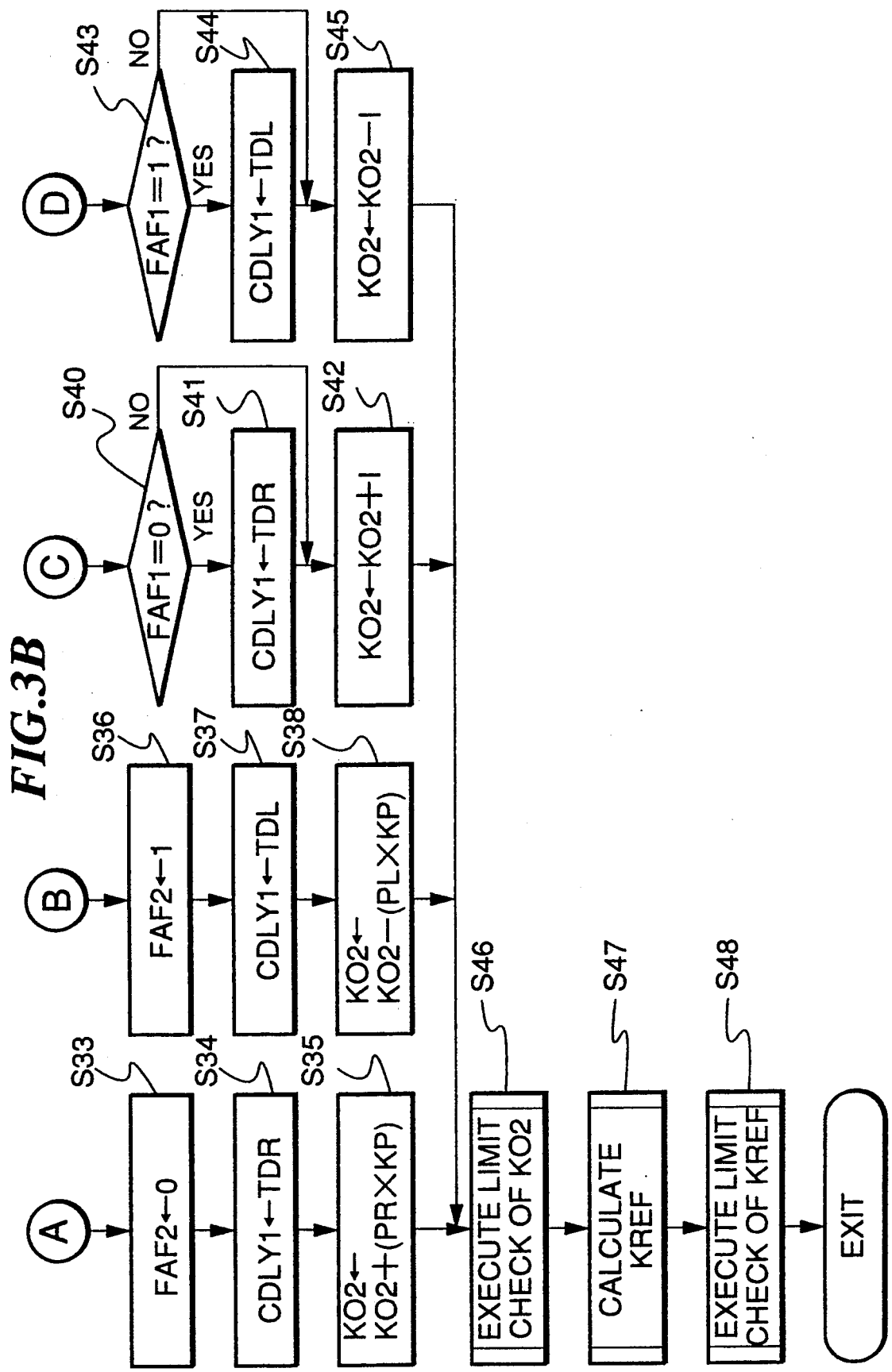
FIG. 3B is a continued part of the flowchart of FIG. 3A.

FIGS. 3A and 3B show a subroutine executed at the step S8 of FIG. 2, where the correction coefficient KO2 is calculated in response to an output voltage FVO2 from the upstream O2 sensor 14.

At a step S21, first and second lean/rich flags FAF1 and FAF2 are initialized. The first lean/rich flag FAF1 is set to a value of "1" when the output voltage FVO2 from the upstream O2 sensor is higher than a reference voltage FVREF (e.g. 0.45 V), that is, when the output voltage FVO2 indicates a rich state of the supplied air-fuel ratio, the second lean/rich flag FAF2 is set to the same value as that of the flag FAF1 upon the lapse of a predetermined time period from a time point the first lean/rich flag FAF1 has been inverted, i.e. when the flag FAF1 has been changed from 0 to 1 or 1 to 0.

Figure 4:
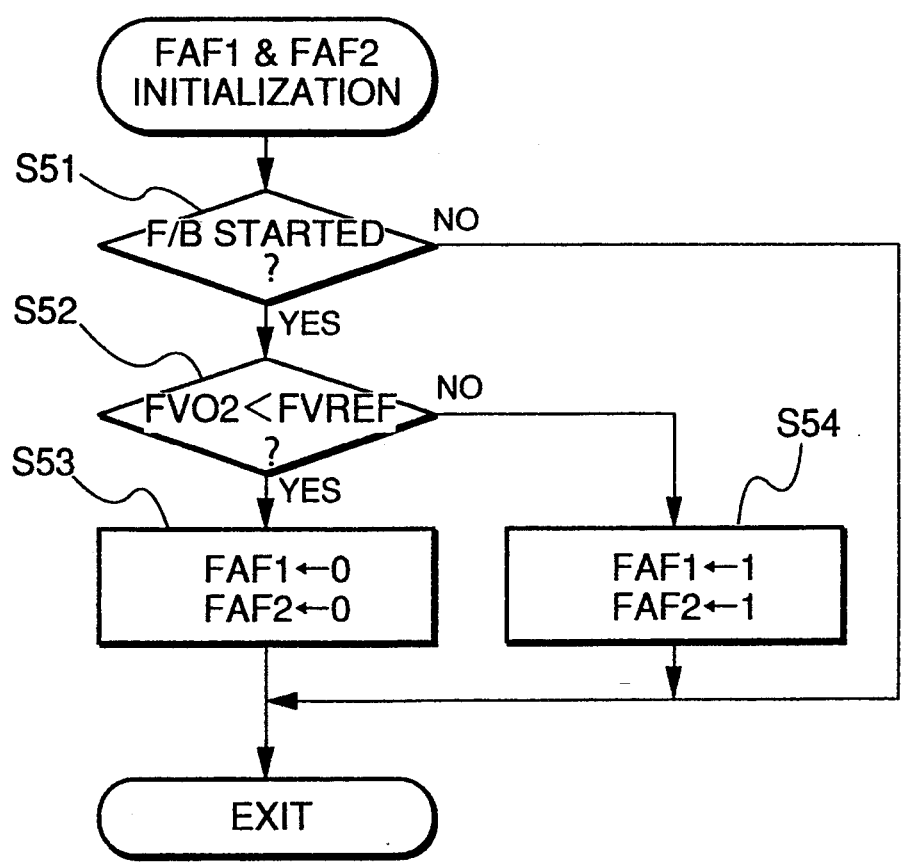
FIG. 4 is a flowchart showing a subroutine for initializing flags used in the program of FIGS. 3A and 3B.

The initialization of these flags FAF1 and FAF2 is executed according to a subroutine shown in FIG. 4. Specifically, first, it is determined at a step S51 whether or not the present loop is immediately after the start of the feedback control, i.e. whether or not the open-loop control was executed in the last loop and the feedback control is to be started in the present loop. If it is determined that the present loop is not the first loop for execution of the feedback control, it is not required to initialize the flags FAF1 and FAF2, and therefore, the present program is immediately terminated.

If the present loop is the first loop for execution of the feedback control, it is determined at a step S52 whether or not the output voltage FVO2 from the upstream O2 sensor is lower than the reference voltage FVREF. If FVO2<FVREF is satisfied, both of the first and second lean/rich flags FAF1 and FAF2 are set to "0" at a step S53, whereas if FVO2≧FVREF, both of the flags are set to "1" at a step S54.

Referring again to the FIG. 3A program, the KO2 value is initialized at a step S22. Specifically, if the present loop is immediately after the shift from the open loop control to the feedback control, or if the throttle valve 3 is suddenly opened during the feedback control mode, the learned value KREF to be calculated at a step S47, described hereinafter, is applied as an initial value of the KO2 value. If the present loop is in a condition other than the above conditions, no initialization of the KO2 value is executed at the step S22.

At the following step S23, it is determined whether or not the KO2 value has been initialized in the present loop. If it is determined that the KO2 value has been initialized, the program jumps to a step S39, whereas if the initialization has not been executed, the program proceeds to a step S24.

When the feedback control is being started, the answer to the question of the step S23 is affirmative (YES), and hence at steps S39 to S45 an initial value of a P term-generation delay counter CDLY1 is set and integral control (I term control) of the KO2 value is executed in response to the values of the lean/rich flags FAF1 and FAF2. The counter CDLY1 measures a delay time from a time point the first lean/rich flag FAF1 is inverted to a time point the second lean/rich flag FAF2 is inverted, i.e. a time period from a time point the O2 sensor output FVO2 is inverted to a time point the proportional control (P term control) is executed.

At the step S39, it is determined whether or not the second lean/rich flag FAF2 is set to "0". If FAF2="0", the program proceeds to the step S40 of FIG. 3B, where it is determined whether or not the first lean/rich flag FAF1 is set to "0". On the other hand, if FASF2=1, the program proceeds to the step S43 of FIG. 3B, where it is determined whether or not the first lean/rich flag FAF1 is set to "1". When the feedback control is being started, if FVO2<FVREF, both of the flags FAF1 and FAF2 are set to "0"(see FIG. 4), and therefore, the program proceeds via the steps S39 and S40 to the step S41, where the counter CDLY1 is set to a predetermined negative value TDR (e.g. approx. 120 msec). If FVO2≧FVREF, both of the flags FAF1 and FAF2 are set to "1", and therefore, the program proceeds via the steps S39 and S43 to the step S44, where the counter CDLY1 is set to a predetermined positive value TDL (e.g. approx. 40 msec). If both of the flags FAF1 and FAF2 are not equal to "0"or "1", the counter CDLY1 is not initialized. If FAF2 ="0", a predetermined value I is added to the KO2 value at the step S42, whereas if FAF2="1", the predetermined value I is subtracted from the KO2 value at the step S45, followed by program proceeding to a step S46.

If the answer to the question of the step S23 of FIG. 3A is negative (NO), i.e. if the KO2 value has not been initialized in the present loop, the program proceeds to a step S24, where it is determined whether or not the upstream O2 sensor output voltage FVO2 is lower than the reference voltage FVREF. If FVO2<FVREF, the program proceeds to a step S25, where the first lean/rich flag FAF1 is set to "0" and the P-term generation delay counter CDLY1 is decremented by a value of 1. Then, it is determined at a step S26 whether or not the count value of the counter CDLY1 is smaller than the predetermined negative value TDR. If CDLY1<TDR, the counter CDLY1 is set to the value TDR at a step S27, whereas if CDLY≧TDR, the program jumps to a step S31.

If the answer to the question of the step S24 is negative (NO) , i.e. if FVO2≧FVREF, the first lean/rich flag FAF1 is set to "1", and the counter CDLY1 is incremented by 1. Then, it is determined at a step S29 whether or not the count value of the counter CDLY1 is smaller than the predetermined positive value TDL. If CDLY1≧TDL, the counter CDLY1 is set to the value TDL at a step S30, whereas if CDLY1<TDL, the program jumps to the step S31.

In this way, the steps S26, S27, S29 and S30 function so that the count value of the counter CDLY1 does not become smaller than the predetermined negative value TDR nor larger than the predetermined positive value TDL.

At the step S31, it is determined whether or not the sign (plus or minus sign) of the count value of the counter CDLY1 has been inverted. If the sign has not been inverted, the I term control is executed at the steps S39 to S45, whereas if the sign has been inverted, the P term control is executed at steps S32 to S38.

At the step S32, it is determined whether or not the first lean/rich flag FAF1 is equal to "0". If FAF1="0", the program proceeds to the step S33 of FIG. 3B, where the second lean/rich flag FAF2 is set to "0", and then the count value of the counter CDLY1 is set to the predetermined negative value TDR at the step S34. Further, the correction coefficient KO2 is calculated at the step S35 by the use of the following equation (2):

$$KO2=KO2+PR \times KP \quad (2)$$

where PR represents an enriching proportional term (P term) and KP represents a P term correction coefficient. The PR value is calculated according to a program of FIG. 6, described hereinafter, and the KP value is read from a map, not shown, which is set in accordance with the engine rotational speed NE and the intake pipe absolute pressure PBA.

If the answer to the question of the step S32 is negative (NO), i.e. if FAF1="1", the second lean/rich flag FAF2 is set to "1" at the step S36, and the count value of the counter CDLY1 is set to the predetermined positive value TDL at the step S37. Further, the correction coefficient KO2 is calculated at the step S38 by the use of the following equation (3):

$$KO2=KO2-PL \times KP \quad (3)$$

where PL represents a leaning proportional term (P term). The PL value is calculated by the program of FIG. 6, similarly to the calculation of the PR value.

Figure 5:
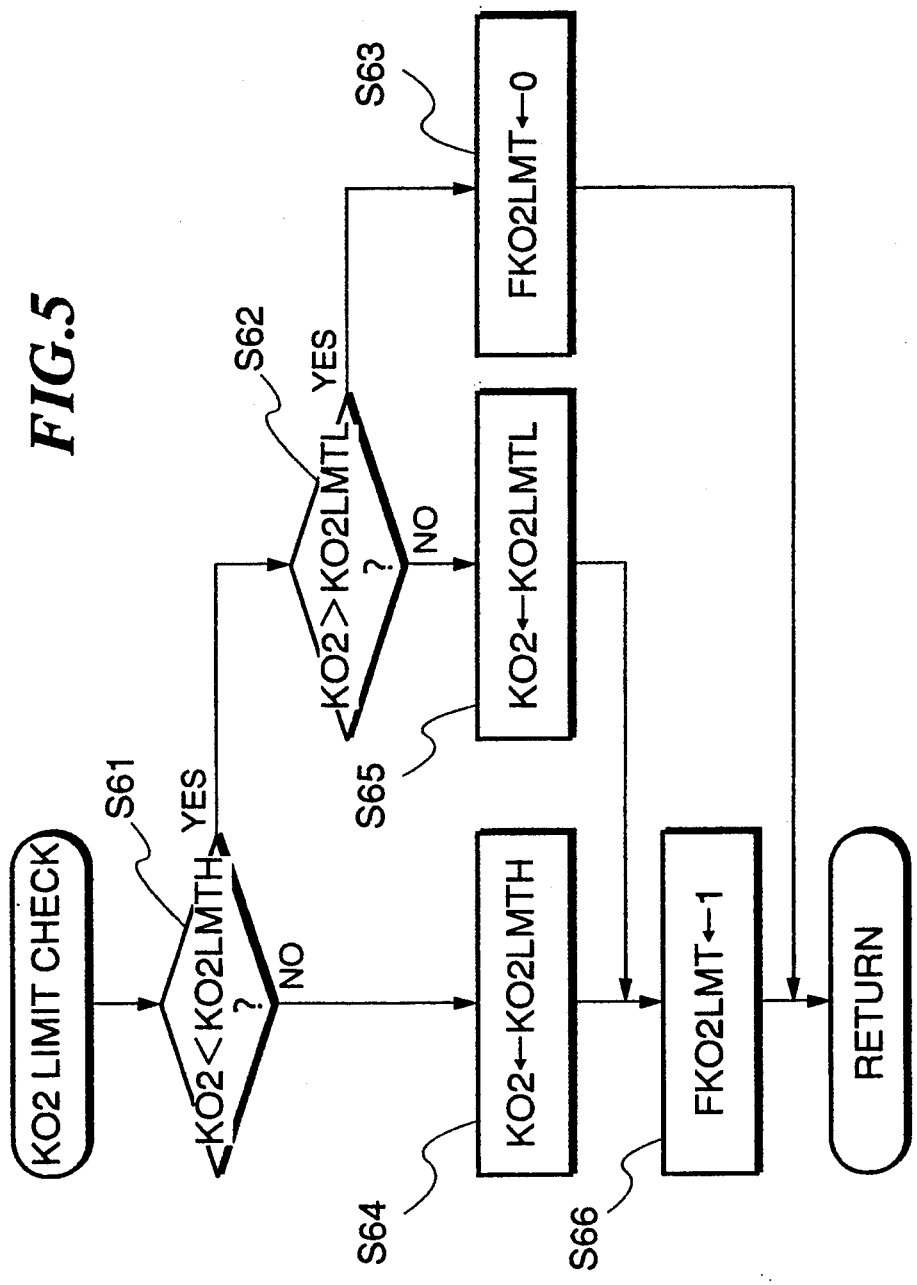
FIG. 5 is a flowchart showing a subroutine for carrying out limit check of the KO2 value.

At the following step S46, limit check of the KO2 value, hereinafter described in FIG. 5, is carried out, and the learned value KREF of the KO2 is calculated at the step S47. Further, limit check of the KREF value is carried out at a step S48, followed by terminating the program.

According to the program of FIGS. 3A and 3B described above, the P term control is executed after a predetermined delay time from a time point the upstream O2 sensor output voltage FVO2 has been inverted. During a time period over which the second lean/rich flag FAF2 is equal to "0", the I term control for increasing the KO2 value is executed, whereas during a time period over which the flag FAF2 is equal to "1", the I term control for decreasing the KO2 value is executed.

Figure 7:
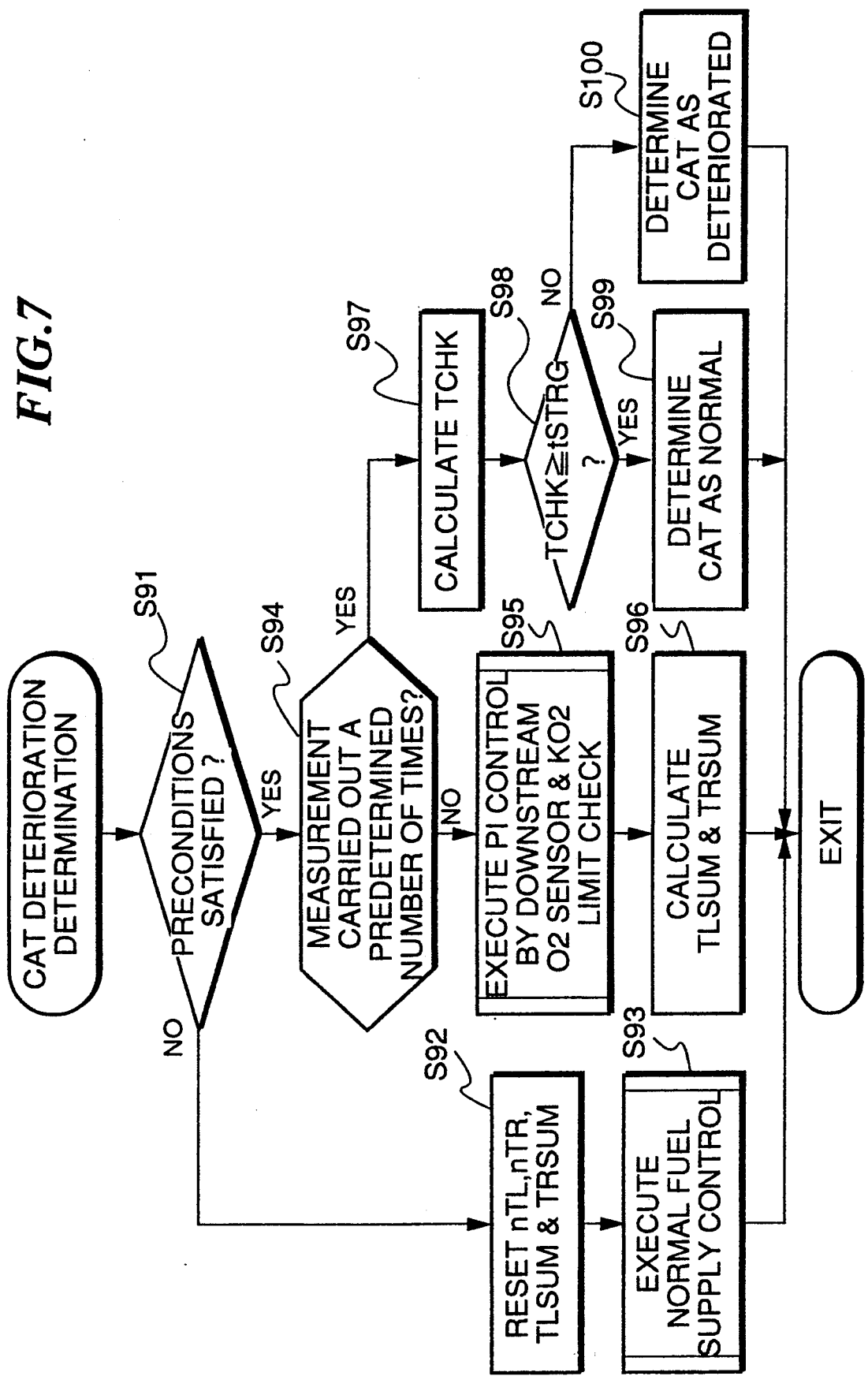
FIG. 7 is a flowchart showing a program for carrying out determination of deterioration of the catalytic converter.

FIG. 5 shows a program for carrying out limit check of the KO2 value which is executed at the step S46 of FIG. 3B and at a step S95 of FIG. 7.

First, at a step S61, it is determined whether or not the KO2 value is smaller than an upper limit value KO2LMTH. If the answer to the question of the step S61 is affirmative (YES), the program proceeds to a step S62, where it is determined whether or not the KO2 value is larger than a lower limit value KO2LMTL. If the answer to the question is affirmative (YES), i.e. KO2LMTL<KO2<KO2LMTH, a flag FKO2LMT is set to "0" at a step S63, followed by terminating the program.

On the other hand, if the answer to the question of the step S61 is negative (NO), i.e. if KO2≧KO2LMTH, or if the answer to the question of the step S62 is negative (NO), i.e. if KO2≦KO2LMTL, the KO2 value is set to the upper limit value KO2LMTH at a step S64 or set to the lower limit value KO2LMTL at a step S65, and then the flag FKO2LMT is set to "1" at a step S66, followed by terminating the program.

Figure 6:
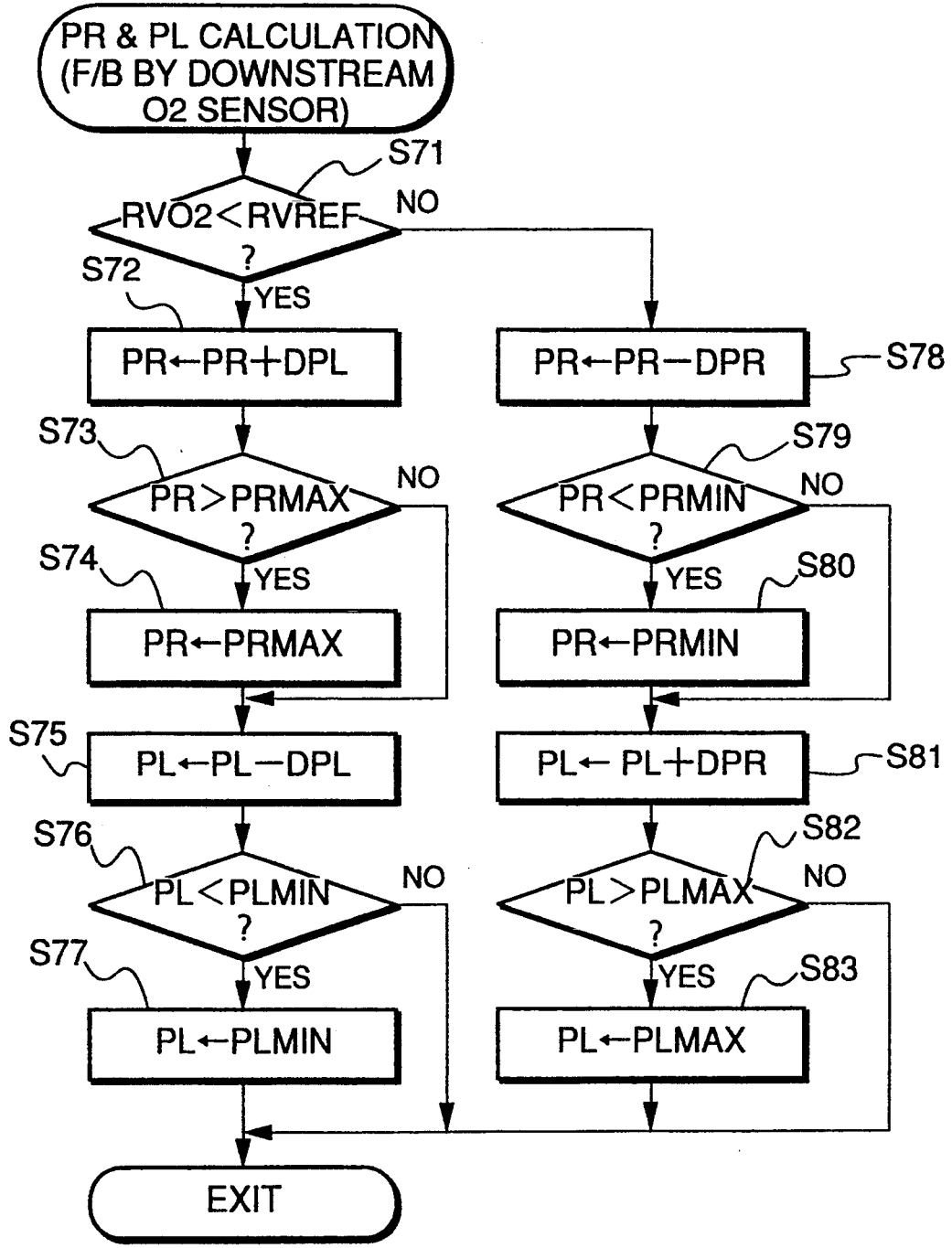
FIG. 6 is a flowchart showing a program for calculating parameter values PR and PL, based on an output from an O2 sensor arranged downstream of the catalytic converter.

FIG. 6 shows a program for calculating the enriching P term PR and the leaning P term PL used in the FIGS. 3A and 3B program. The present program is executed at predetermined fixed time intervals (e.g. 100 msec).

The PR value and the PL value are basically calculated based on the output voltage RVO2 from the downstream O2 sensor 15 (second feedback control). However, when the second feedback control cannot be executed (e.g. during idling of the engine, when the downstream O2 sensor 15 is inactive, etc.), a predetermined value or the learned value calculated during the feedback control is applied as the PR and PL values.

At a step S71, it is determined whether or not the downstream O2 sensor output voltage RVO2 is lower than a reference value RVREF (e.g. 0.45 V). If RVO2<RVREF, the program proceeds to a step S72, where a leaning-determining correction term DPL is added to the PR value. When the PR value exceeds an upper limit value PRMAX at a step S73, the PR value is set to the upper limit value PRMAX at a step S74.

At the next step S75, the leaning-determining correction term DPL is subtracted from the PL value. If the PL value is smaller than a lower limit value PLMIN at a step S76, the PL value is set to the lower limit value PLMIN at a step S77.

On the other hand, if the answer to the question of the step S71 is negative (NO), i.e. if RVO2≧RVREF, the program proceeds to a step S78, where an enrichment-determining correction term DPR is subtracted from the PR value. If it is determined at a step S79 that the PR value after the subtraction is smaller than a lower limit value PRMIN, the PR value is set to the lower limit value PRMIN at a step S80.

Then, at a step S81, the enrichment-determining correction term DPR is added to the PL value. If it is determined at a step S82 that the PL value after the addition is larger than an upper limit value PLMAX, the PL value is set to the upper limit value PLMAX at a step S83.

According to the program of FIG. 6, described above, for a time period over which RVO2<RVREF holds, the PR value is increased within a range between the lower and upper limit values PRMIN and PRMAX, while the PL value is decreased within a range between the lower and upper limit values PLMIN and PLMAX. On the other hand, for a time period over which RVO2≧RVREF holds, the PR value is decreased, and the PL value is increased within the above-mentioned respective ranges.

Figure 9:
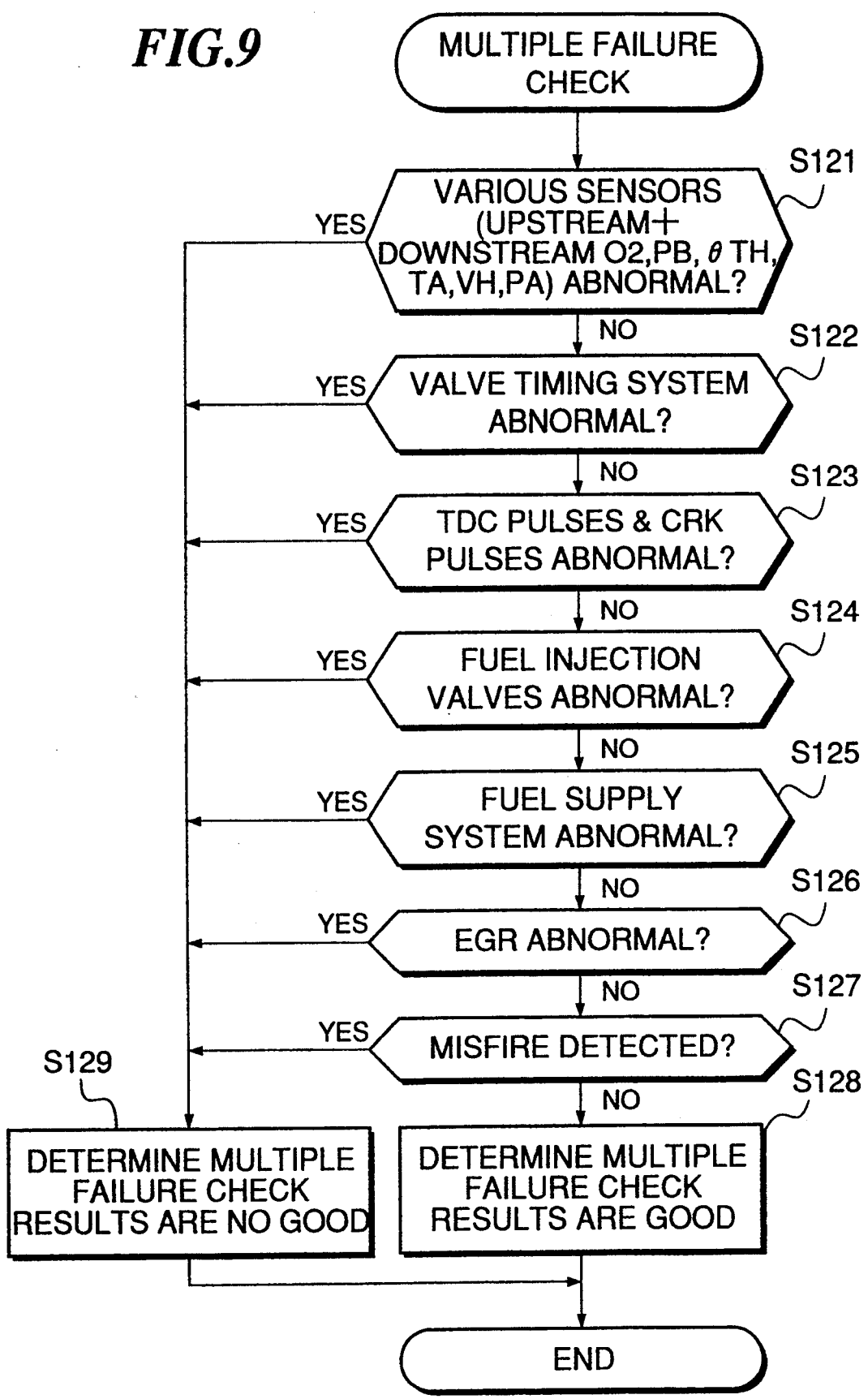
FIG. 9 is a flowchart showing a program for carrying out a multiple failure check.
Figure 10:
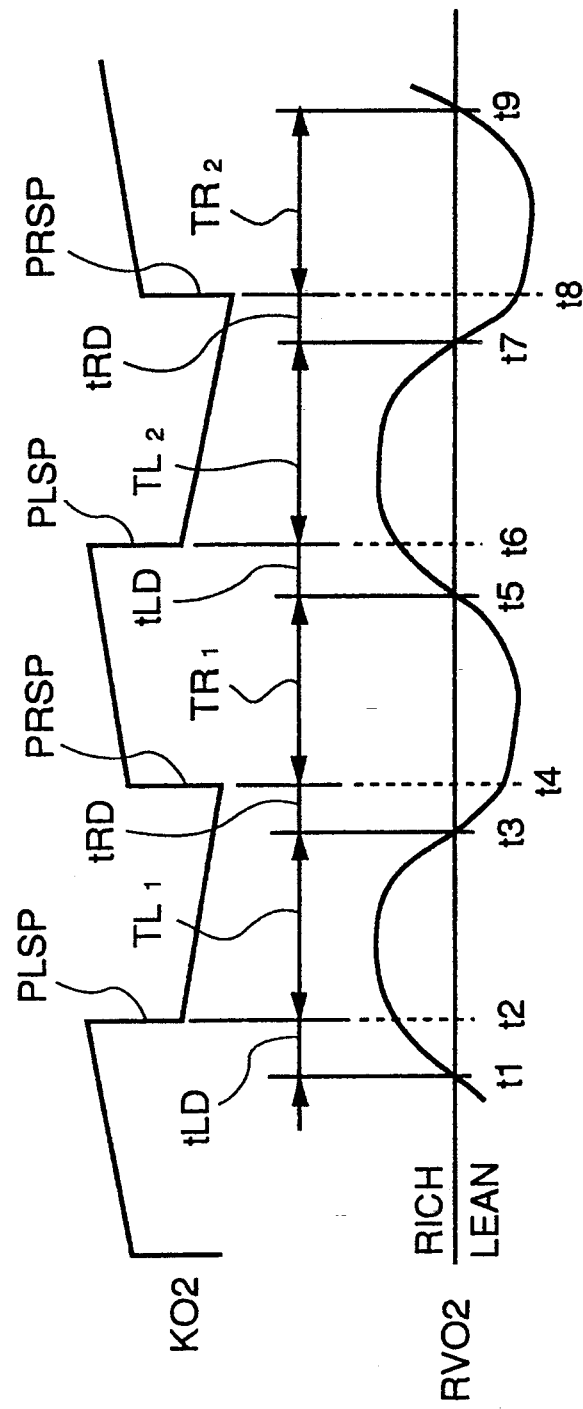
FIG. 10 is a timing chart which is useful in explaining the operation of the program of FIG. 9.

Next, how deterioration of the performance of the catalyst 13 is determined will be described with reference to FIGS. 7 to 11. As shown in FIG. 10, during execution of feedback control in which the correction coefficient KO2 is calculated based only on the output RVO2 from the downstream O2 sensor 15, calculations are made of a time period TL elapsed from a time point a special P term PLSP for skipping the KO2 value in the decreasing direction is generated to a time point the output RVO2 from the O2 sensor 15 is inverted correspondingly, and a time period TR elapsed from a time point a special P term PRSP for skipping the KO2 value in the increasing direction is generated to a time point the output RVO2 from the O2 sensor 15 is inverted correspondingly. The determination as to deterioration of the catalyst performance is carried out based on the thus calculated time periods TL and TR.

FIG. 7 shows a program for executing the above deterioration determination. At a step S91, it is determined whether or not preconditions for effecting the deterioration determination are satisfied. A program for carrying out the precondition determination is shown in FIG. 8.

Figure 8:
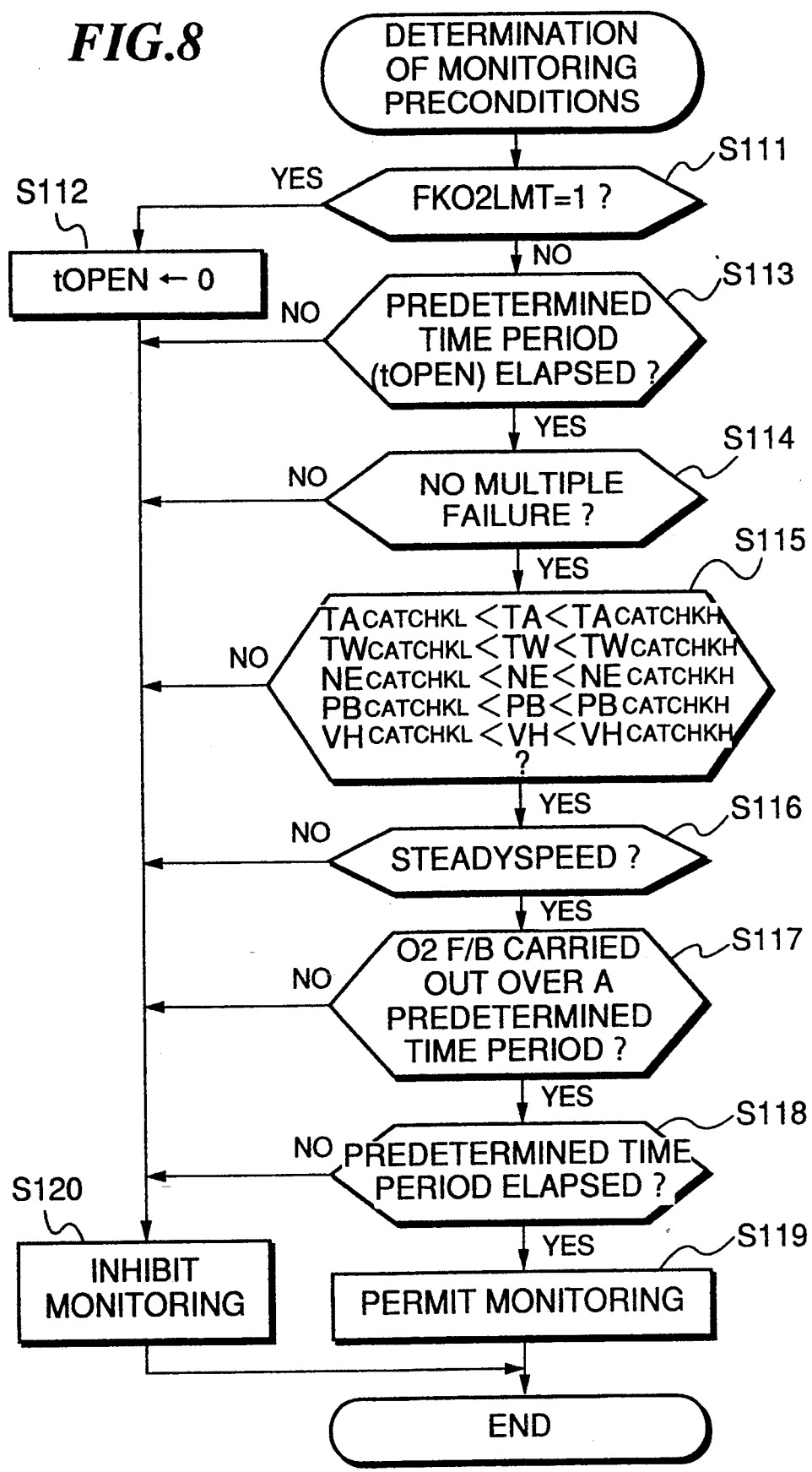
FIG. 8 is a flowchart showing a subroutine for determining monitoring preconditions for determination of the deterioration.

At a step S111 in FIG. 8, it is determined whether or not the flag FKO2LMT, which is set to "1" when the KO2 value is held at the upper limit value or the lower limit value, has been set to "1". If the flag FKO2LMT has been set to "1", the program proceeds to a step S112, where a counter for measuring a predetermined time period tOPEN is reset and started. Then, monitoring of CAT deterioration is inhibited at a step S120, followed by terminating the program. If the flag FKO2LMT has been set to "0", it is determined at the step S113 whether or not the predetermined time period tOPEN (e.g. 10 sec) has elapsed. If the predetermined time period tOPEN has not elapsed, the program is terminated after execution of the step S120. If the answer to the question of the step S113 is affirmative (YES), i.e. if the predetermined time period tOPEN has elapsed, it is determined that the predetermined time period tOPEN has elapsed after the KO2 value, which had been held at the upper limit value or the lower limit value, returned to an intermediate value within the predetermined range between the upper limit value and the lower limit value, which means that the air-fuel ratio control is now being stably carried out, followed by the program proceeding to a step S114.

At the step S114, it is determined whether or not a multiple failure check, described hereinafter, which is executed to determine whether the monitoring can be started, provides a result that there is no failure in any of sensors and devices subjected to failure check. If there is no failure in any of the sensors and devices, the program proceeds to a step S115, where it is determined whether or not the operating condition of the engine 1 satisfies monitoring conditions. Specifically, it is determined whether or not an output TA from the intake air temperature sensor 8 is within a range of 60° to 100° C., whether or not an output TW from the engine coolant temperature 9 is within a range of 60° to 100° C., whether or not an output Ne from the engine rotational speed sensor 10 is within a range of 2800 to 3200 rpm, whether or not an output PBA from the intake pipe absolute pressure 7 is within a range of −350 to −250 mmHg, and whether or not an output VH from the vehicle speed sensor 11 is within a range of 32 to 80 km/h.

Then, at a step S116, it is determined whether or not the vehicle speed VH is in a steady state, i.e. whether or not the output VH from the vehicle speed sensor 11 has continuously been within a variation range of 0.8 km/sec over a predetermined time period (e.g. 2 sec).

Then, it is determined at a step S117 whether or not feedback control has been carried out over a predetermined time period (e.g. 10 sec) before permission of the monitoring. Further, it is determined at a step S118 whether or not a predetermined time period (e.g. 2 sec) has elapsed after the answer to the question of the step S117 became affirmative (YES).

Thus, all of the answers to the questions of the above steps S115 to S118 are affirmative (YES), the monitoring is permitted at a step S119, followed by the program proceeding to a step S94 of the FIG. 7 program. On the other hand, if any of the answers to the questions of the above steps is negative (NO), the monitoring is inhibited, followed by the program proceeding to a step S92 of the FIG. 7 program.

Next, details of the multiple failure check executed at the monitoring preconditions will be described with reference to FIG. 9.

First, it is determined at a step S121 whether or not various parameter sensors are abnormal, i.e. whether or not any of the upstream O2 sensor 14, the downstream O2 sensor 15, the PBA sensor 7, the θTH sensor 4, the TA sensor 8, the TW sensor 9, the VH sensor 19A and the PA sensor 19B is abnormal.

Abnormalities of the sensors which are checked at the step S121 are as follows: As to the upstream O2 sensor 14, disconnection/short-circuit and deterioration thereof are checked based on the output voltage value therefrom. If the O2 sensor 14 is provided with a heater for shortening the time period required for activation of the sensor in cold weather, disconnection/short-circuit of the heater is also checked. As to the downstream O2 sensor 15, the internal impedance is measured by applying a predetermined voltage to the sensor to see whether it falls outside a predetermined range, and disconnection/short-circuit of a heater thereof is also checked when the downstream O2 sensor is provided with the heater. As to the PBA sensor 7, θTH sensor 4, TA sensor 8, TW sensor 9, VH sensor 19A and PA sensor 19B, disconnection/short-circuit thereof is checked based on an output voltage value from the sensor.

If the answer to the question of the step S121 is negative (NO), i.e. if none of the sensors is abnormal, the program proceeds to a step S122.

At the step S122, it is determined whether or not the valve timing changeover system 14 is abnormal. For example, the changeover system 14 is determined to be abnormal when changeover of the valve timing is not carried out based on a command from the ECU, or when the hydraulic pressure for driving the changeover system is not as high as a required level. If the answer to the question of the step S122 is negative (NO), i.e. if the valve timing changeover system 14 is determined to be normally functioning, the program proceeds to a step S123.

At the step S123, it is determined whether or not generation of TDC pulses or CRK pulses is abnormal. If the answer at the step S123 is negative (NO), i.e. if the generation of both TDC pulses and CRK pulses is not abnormal, the program proceeds to a step S124.

At the step S124, it is determined whether or not the fuel injection valves 5 are abnormal. If none of the fuel injection valves 5 has abnormality due to clogging, seizure with foreign matters, or the like, the program proceeds to a step S125, where it is determined whether or not the fuel supply system, such as the fuel pump and the fuel supply pipe, is abnormal such that the fuel supply amount cannot be controlled within a proper range. If the answer to the question of the step S125 is negative (NO), the program proceeds to a step S126.

At the step S126, it is determined whether or not the EGR system 20 is abnormal. If the EGR system 20 has no abnormality, the program proceeds to a step S127.

At the step S127, it is determined whether or not a misfire has been detected in any cylinder. If the answer is negative (NO), i.e. if spark ignition is normally carried out by all the spark plugs 18, the program proceeds to a step S128, where it is determined that the results of the multiple failure check are good.

In this way, when all of the answers to the questions of the step S121 to S128 are negative (NO), i.e. if no abnormality is present at any of the various sensors and devices, it is determined that the results of the multiple failure check are good, which means that the answer to the question of the step S114 of FIG. 8 becomes affirmative (YES), and then the program proceeds to the following step S115.

On the other hand, if any of the answers to the questions at the steps S121 to S128 is affirmative (YES), i.e. if any of the sensors and devices is abnormal, the program proceeds to a step S129, to determine that the results of the multiple failure check are not good. Thus, the answer to the question of the step S114 becomes negative (NO), leading to inhibition of the monitoring at the step S120.

Referring again to FIG. 7, if the preconditions for the deterioration determination are not satisfied, cumulative values TLSUM and TRSUM of the time periods TL and TR and numbers of times of measurement nTL and nTR of the time periods TL and TR are all reset to 0 at a step S92, and the normal fuel supply control according to the programs of FIGS. 3A, 3B to 6, described previously, is executed at a step S93.

If the preconditions are satisfied, it is determined at a step S94 whether or not the measurements of the TL and TR values have been carried out a predetermined number of times. In the first loop of execution of the program, the answer to the question at the step S94 becomes negative (NO), and therefore the program proceeds to a step S95, where the PI (proportional integral) control and the limit check of the KO2 value (described in FIG. 5 hereinbefore) is executed, based only on the downstream O2 sensor output RVO2, and the TL and TR values are measured. Then, the cumulative values TLSUM and TRSUM thereof are calculated at a step S96.

Specifically, as shown in FIG. 10, at a time point t2 a predetermined time period tLD has elapsed after a time point t1 a lean-to-rich inversion of the O2 sensor output RVO2 occurred, the KO2 value is skipped in the decreasing direction by generating the special P term PLSP, and then the I term control is executed by gradually decreasing the KO2 value until a time point t4 a predetermined time period tRD elapses after a time point t3 a rich-to-lean inversion of the sensor output RVO2 subsequently occurs. The time period from the time point t2 to the time point t3 is measured as a TL value ($TL_1$). Next, at the time point t4, the KO2 value is skipped in the increasing direction by the use of the special P term PRSP for increasing the KO2 in the enriching direction, and then the I term control is executed by gradually increasing the KO2 value until a time point t6 a predetermined time period tLD elapses after a time point t5 a lean-to-rich inversion of the sensor output RVO2 subsequently occurs. The time period from the time point t4 to the time point t5 is measured as a TR value ($TR_1$). Thereafter, $TL_2$, $TR_2$, . . . are successively measured in the same manner as above, followed by cumulating the measured TL and TR values to obtain cumulative values TLSUM and TRSUM.

If the answer to the question of the step S94 is affirmative (YES), i.e. if the measurement has been carried out the predetermined number of times, a determination time period TCHK is calculated by the use of the following equation (4) at a step S97:

$$TCHK = (TLSUM/nTL + TRSUM/nTR)/2 \qquad (4)$$

Then, it is determined whether or not the determination time period TCHK exceeds a predetermined value tSTRG at a step S98. If the former exceeds the latter, it is determined at a step S99 that the catalyst 13 is in a normal state, whereas if the former is below the latter, it is determined at a step S100 that the catalyst is deteriorated.

Figure 11:
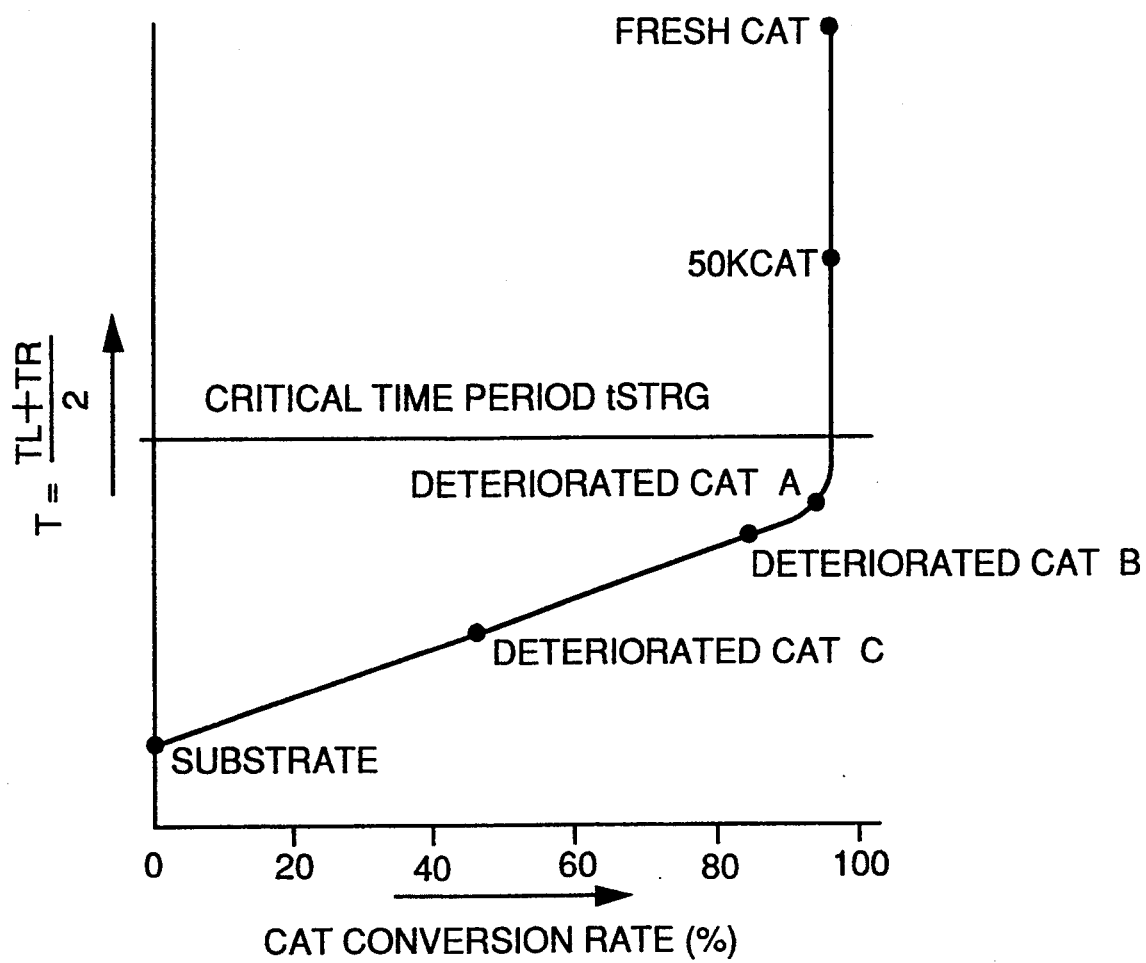
FIG. 11 is a graph which is useful in explaining a manner of the deterioration determination of the catalytic converter.

This deterioration determination is based on the fact that an average value T of the time periods TL and TR and the purification rate of the catalyst (CAT conversion rate) are in the relationship as shown in FIG. 11. As shown in the figure, the average value T decreases as the performance of the catalyst (O2 storage capacity) is deteriorated. By utilizing this relationship, the deterioration of the catalyst can be accurately determined.

As is apparent from FIG. 11, the determination time period TCHK indicates the deterioration degree of the catalyst, and therefore the correction terms DPR and DPL or the predetermined values TDR and TDL for determining the delay times may be set so as to gradually change with advancement of the deterioration degree (TCHK) of the catalyst.

Figure 12:
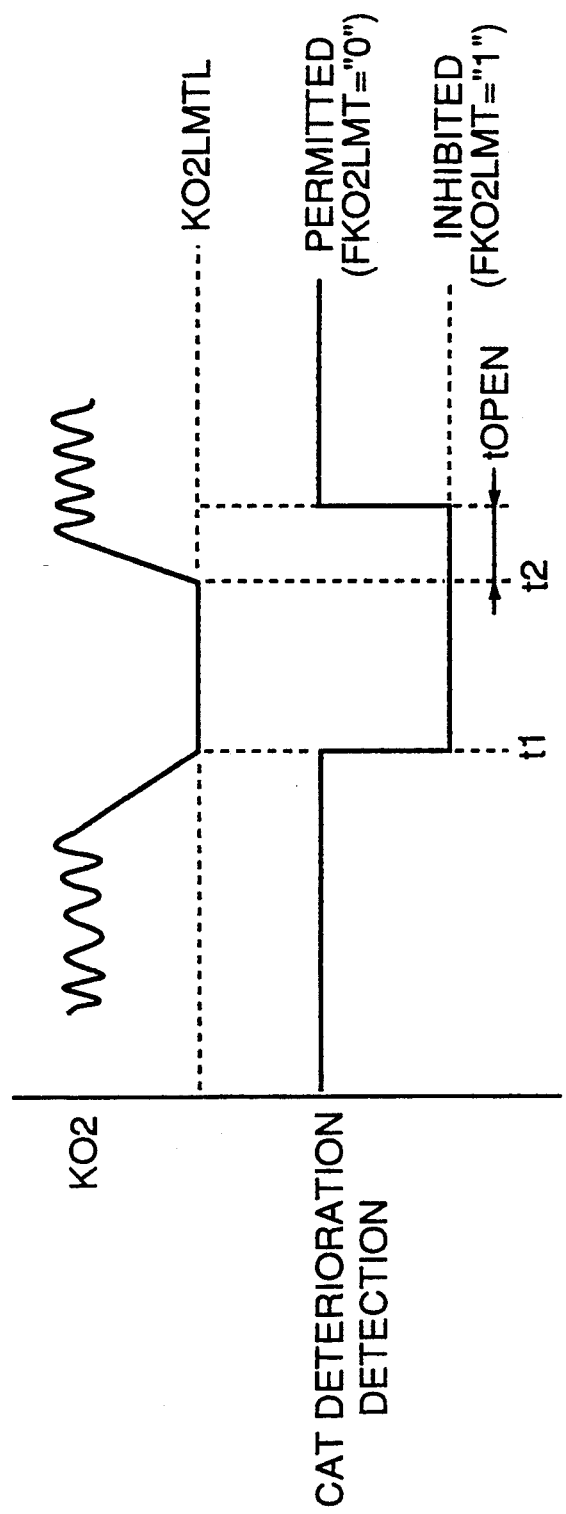
FIG. 12 is a timing chart which is useful in explaining the feature of the present invention.

FIG. 12 shows a timing chart which is useful in explaining the feature of the present embodiment. The figure shows an example where the KO2 value is held at the lower limit value KO2LMTL. Before the time point t1 the KO2 value is held at the lower limit value KO2LMTL, the flag FKO2LMT is set to "0", whereby the detection of deterioration of the catalyst is permitted. After the time point t1 and before the time point t2, due to purging of a large amount of evaporative fuel into the intake system, for instance, the KO2 value is held at the lower limit value KO2LMTL, so that the flag FKO2LMT is set to "1", whereby the detection of deterioration of the catalyst is inhibited. After the time point t2, the amount of evaporative fuel is decreased so that the KO2 value returns from the lower limit value KO2LMTL to an intermediate value within the predetermined range. However, the flag FKO2LMT continues to be set to "1" until the predetermined time period tOPEN elapses. Thus, the detection of deterioration of the catalyst is permitted after the air-fuel ratio control becomes stable.

A second embodiment of the invention will be described with reference to FIG. 13 which shows a program for carrying out limit check of the air-fuel ratio correction coefficient KO2. The second embodiment is different from the first embodiment described hereinabove only in the limit check of the KO2 value, and FIGS. 1 to 4 and 6 to 11 are applicable to the second embodiment as well. According to the second embodiment, two sets of upper and lower limit values KO2LMTH1, KO2LMTL1; KO2LMTH2, KO2LMTL2 are provided, with which the KO2 value is to be compared. The second upper and lower limit values KO2LMTH2, KO2LMTL2 correspond to the upper and lower limit values KO2LMTH, KO2LMTL employed in the first embodiment (FIG. 5), which are set at such values (e.g. 1.35 and 0.65, respectively) that if the KO2 value falls out of the range defined by the upper and lower limit values KO2LMTH2, KO2LMTL2, the air-fuel ratio cannot be properly controlled. The first upper and lower limit values KO2LMTH1, KO2LMTL1 according to the present embodiment are provided for deciding whether to inhibit the detection of deterioration of the catalyst 13 and set at values (e.g. 1.30 and 0.70, respectively) slightly closer to the central or no-correction value of 1.0 than the second upper and lower limit values KO2LMTH2, KO2LMTL2.

Figure 13:
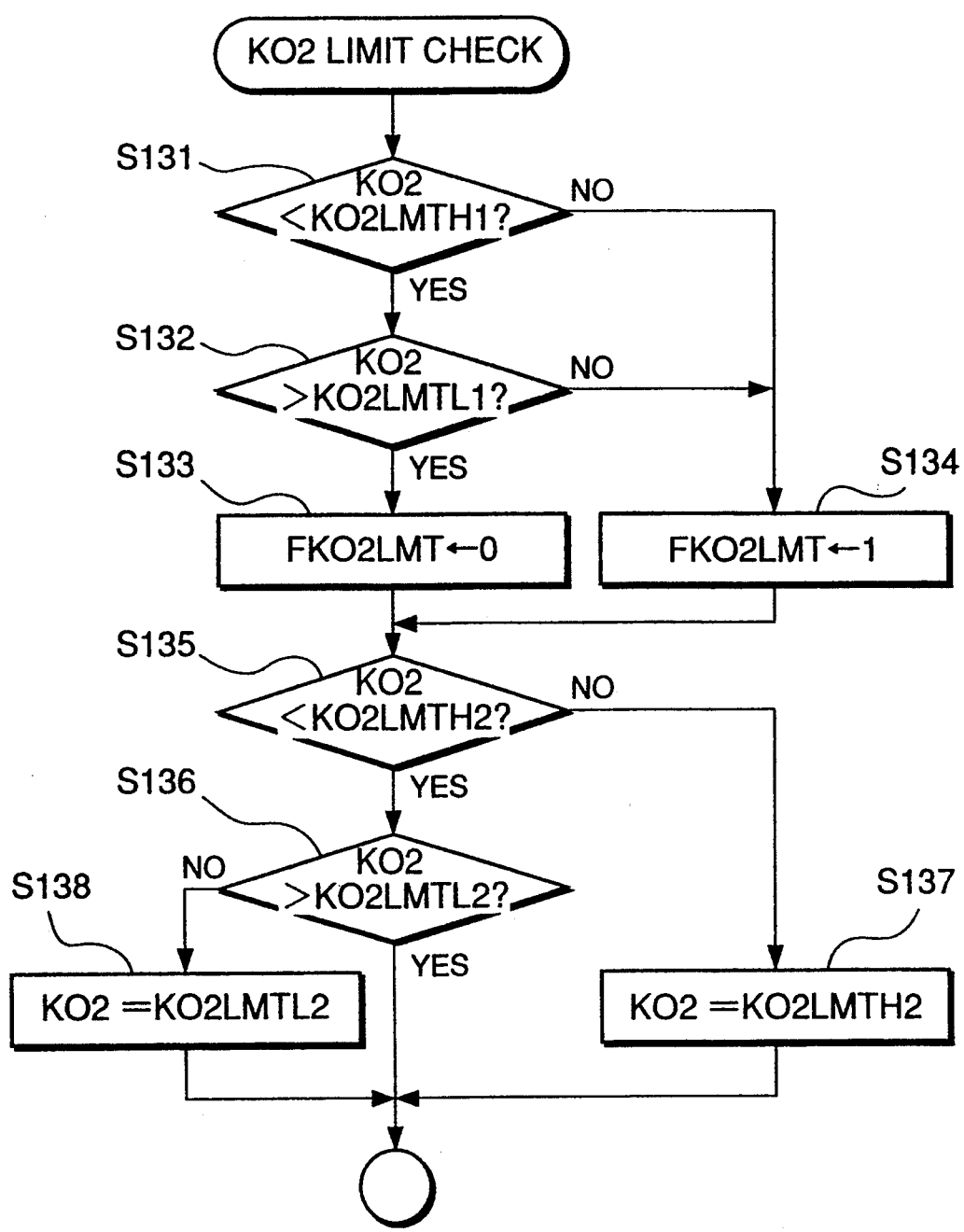
FIG. 13 is a flowchart for carrying out limit check of the correction coefficient KO2 according to a second embodiment of the invention.

In FIG. 13, it is determined at a step S131 whether or not the KO2 value is below the first upper limit value KO2LMTH1. If the answer is affirmative (YES), it is determined at a step S132 whether or not the KO2 value is above the first lower limit value KO2LMTL1. If the answer is affirmative (YES), i.e. if the KO2 value falls within the range defined by the first upper and lower limit values KO2LMTH1, KO2LMTL1, the flag KO2LMT is set to "0" indicating permission of the detection of deterioration of the catalyst 13, at a step S133.

On the other hand, if the answer to either the step S131 or the step S132 is negative (NO), the flag FKO2LMT is set to "1" indicating inhibition of the detection of deterioration of the catalyst, at a step S134.

Then, at a step S135, it is determined whether or not the KO2 value is below the second upper limit value KO2LMTH2. If the answer is affirmative (YES), it is determined at a step S136 whether or not the KO2 value is above the second lower limit value KO2LMTL2. If the answer is affirmative (YES), i.e. if the KO2 value falls within the range defined by the second upper and lower limit values KO2LMTH2, KO2LMTL2, the present program is terminated, to use the KO2 value as it is. On the other hand, if the answer to the question of the step S135 is negative (NO), the KO2 value is set to the second upper limit value KO2LMTH2, whereas if the answer to the question of the step S136 is negative (NO), the KO2 value is set to the second lower limit value KO2LMTL2.

Figure 14:
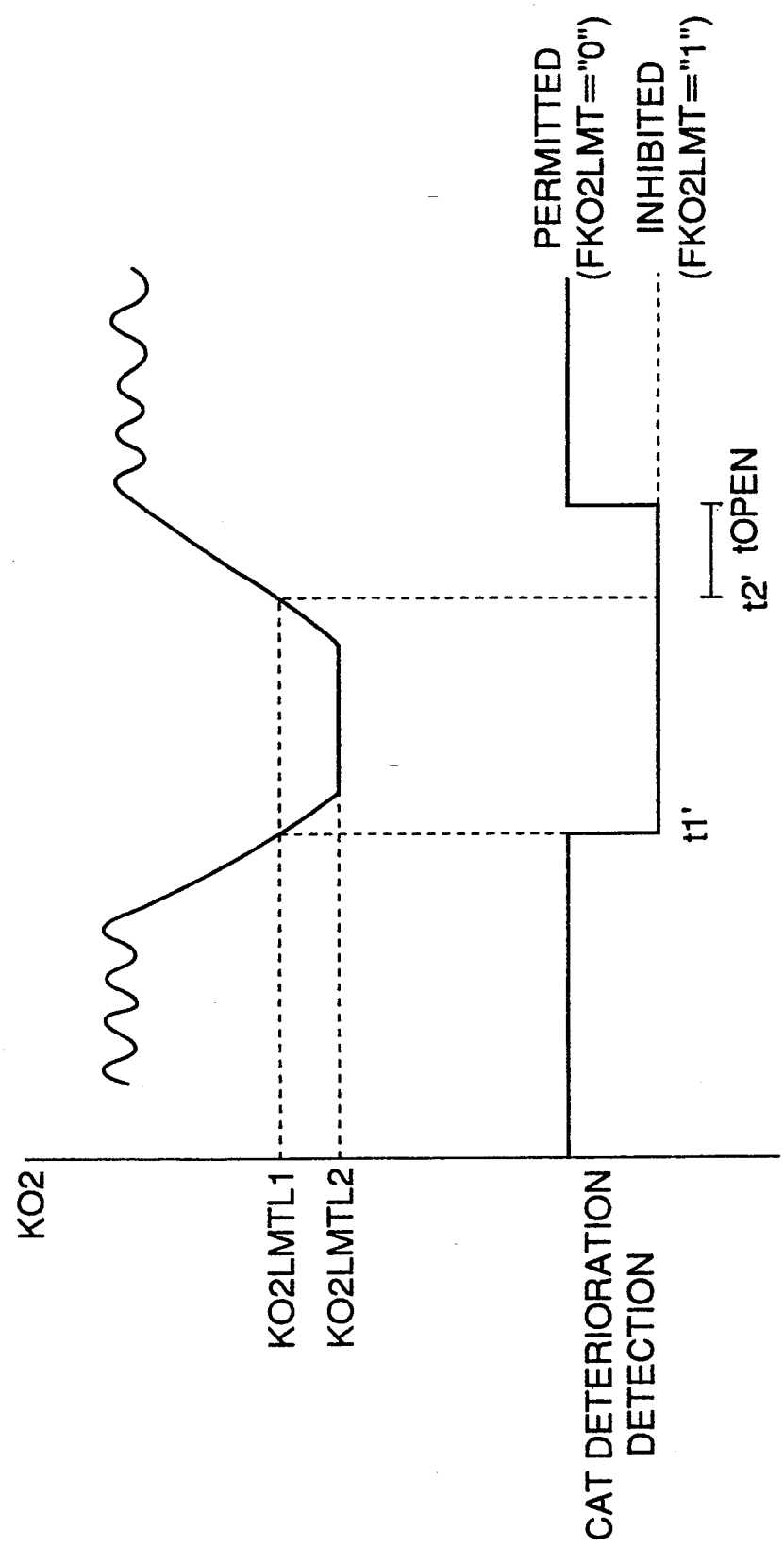
FIG. 14 is a timing chart useful in explaining the feature of the second embodiment.

FIG. 14 is a timing chart useful in explaining the feature of the second embodiment described above. According to the second embodiment, as distinguished from FIG. 12 showing the first embodiment, before a time point t1' the KO2 value reaches the first lower limit value KO2LMTL1, the flag FKO2LMT is set to "0", whereby the detection of deterioration of the catalyst 13 is permitted. After the time point t1' and before a time point t2' where the air-fuel ratio is rich due to purging of a large amount of evaporative fuel into the intake pipe 2 or the like, the KO2 value is decreased below the first lower limit value KO2LMTL1 so that the flag FKO2LMT is set to "1", whereby the detection of deterioration of the catalyst 13 is inhibited, even before the KO2 reaches the second lower limit value KO2LMTL2. Then, the KO2 value reaches and is temporarily held at the second lower limit value KO2LMTL2. When the amount of evaporative fuel decreases, for instance, the KO2 value is increased above the first lower limit value KO2LMTL1 at the time point t2'. Upon the lapse of the predetermined time period tOPEN after the time point t2', the flag FKO2LMT is set to "0" to permit the detection of deterioration of the catalyst 13.

Thus, according to the second embodiment described above, detection of deterioration of the catalyst can be carried out with higher accuracy.

What is claimed is:

1. An air-fuel ratio control system for an internal combustion engine having an exhaust system, and catalytic converter means arranged in said exhaust system, comprising:

first and second air-fuel ratio sensor means arranged in said exhaust system upstream and downstream of said catalytic converter means, respectively;

air-fuel ratio correction amount-calculating means for calculating an air-fuel ratio correction amount, based at least on an output from said first air-fuel ratio sensor means, catalytic converter deterioration-detecting means for detecting deterioration of said catalytic converter means, based on an output from said second air-fuel ratio sensor means when the engine is in a predetermined operating condition; and deterioration detection-inhibiting means for inhibiting operation of said catalytic converter deterioration-detecting means when said air-fuel ratio correction amount falls outside a predetermined range.

2. An air-fuel ratio control system as claimed in claim 1, including deterioration detection-permitting means for permitting the operation of said catalyst deterioration-detecting means after a predetermined time period elapses from a time said air-fuel ratio correction amount returns into said predetermined range.

3. An air-fuel ratio control system as claimed in claim 1, including limiting means for limiting said air-fuel ratio correction amount within a first predetermined range when said air-fuel ratio correction amount falls outside said first predetermined range, and wherein said deterioration detection-inhibiting means inhibits the operation of said catalytic converter deterioration-detecting means when said air-fuel ratio correction amount falls outside a second predetermined range included within said first predetermined range.

4. An air-fuel ratio control system as claimed in claim 1, including correcting means for correcting said air-fuel ratio correction amount, based on said output from said second air-fuel ratio sensor means.

5. An air-fuel ratio control system as claimed in claim 1, including inversion period-measuring means for measuring an inversion period with which said output from said second air-fuel ratio sensor means is inverted, and wherein said catalytic converter deterioration-detecting means detects deterioration of said catalytic converter means, based on the measured inversion period.

6. An air-fuel ratio control system for an internal combustion engine having an exhaust system, and catalytic converter means arranged in said exhaust system, comprising:

air-fuel ratio sensor means arranged in said exhaust system downstream of said catalytic converter means;

air-fuel ratio correction amount-calculating means for calculating an air-fuel ratio correction amount, based at least on an output from said air-fuel ratio sensor means;

catalytic converter deterioration-detecting means for detecting deterioration of said catalytic converter means, based on said output from said air-fuel ratio sensor means when the engine is in a predetermined operating condition; and deterioration detection-inhibiting means for inhibiting operation of said catalytic converter deterioration-detecting means when said air-fuel ratio correction amount falls outside a predetermined range.

* * * * *

UNITED STATES PATENT AND TRADEMARK OFFICE
CERTIFICATE OF CORRECTION

PATENT NO. : 5,386,695

DATED : February 7, 1995

INVENTOR(S) : IWATA et al.

It is certified that error appears in the above-identified patent and that said Letters Patent is hereby corrected as shown below:

Cover page, item [73], line 2, delete "Kaihsa" and substitute --KAISHA--.

Signed and Sealed this

Twenty-fourth Day of October, 1995

Attest:

BRUCE LEHMAN

Attesting Officer

Commissioner of Patents and Trademarks